1663X
A. Norton,
Cheese Press,
Patented Feb. 11, 1812.
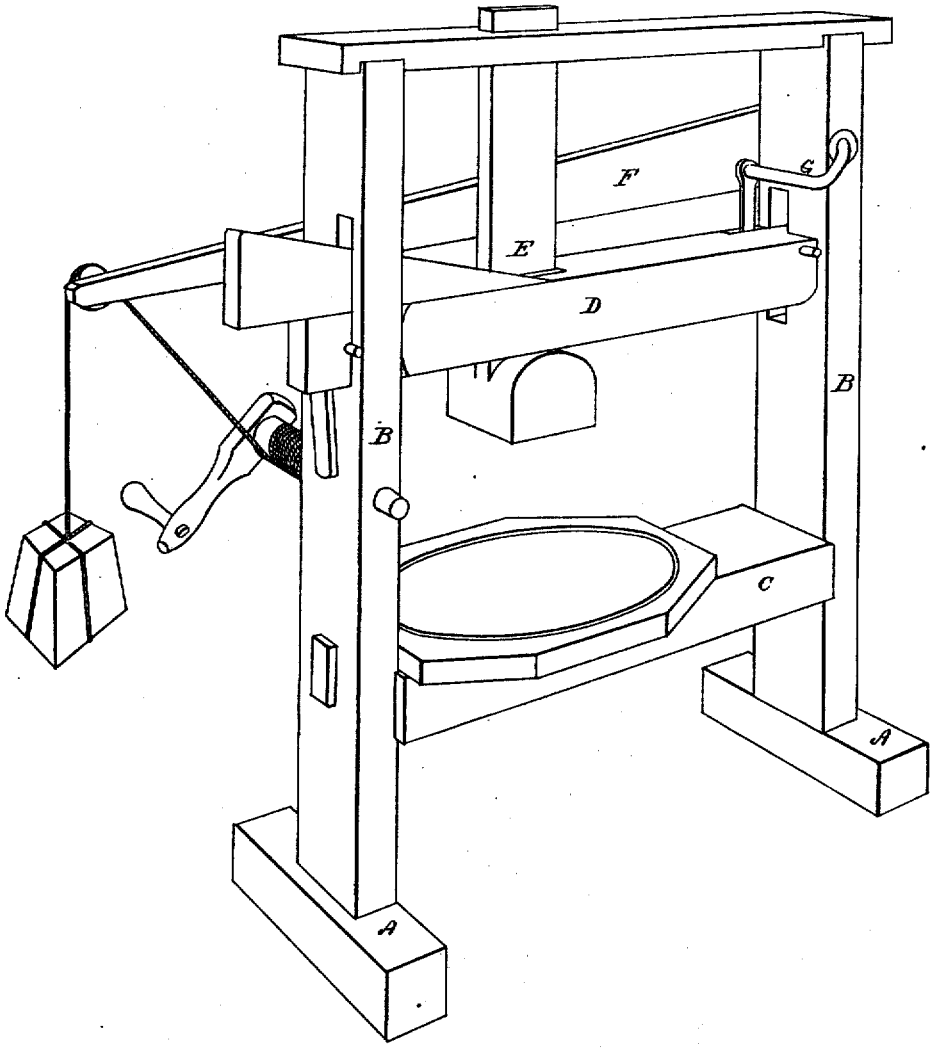
AM. PHOTO-LITHO. CO. N.Y. (OSBORNE'S PROCESS)

Abraham Norton
Letters Patent

The Schedule referred to in these Letters Patent and making part of the same containing a description in the words of the said Abraham Norton himself of his "Increasing Press."

This Press which is capable of considerable variety in form may when simple be constructed as follows and is then applicable to the pressing of cheese and all substances to which continued pressure is wanted. Upon two horizontal sills (placed so far apart as to allow the required length of bench and the pressing beam hereafter mentioned to extend between them) rise two vertical posts of the height necessary to support the machinery. The bench or support for the articles to be pressed is nearest to the bottom and extends between the upright posts above mentioned their tops being connected by a horizontal girt or brace. In one of those upright posts is a vertical mortice to receive one end of the pressing beam, which is kept in its place while pressing by a triangular or tapering wedge that passes through the mortice above the beam. The pressing beam has a tenant at one end which goes into the mortice of the post above mentioned where it rests and is confined by the wedge. This part of the post supporting it as a fulcrum. The pressing beam is of such length as to extend across the press its opposite end rising and falling in a mortice or groove in the other upright post so as to keep it steady when raised or lowered by the lever herein described. There is a mortice through this pressing beam through which rises the upper end of the follower or presser. This follower also goes through a mortice in the upper girt so as to preserve a vertical motion. The pressing beam lays upon a projecting shouldering in the presser or follower so that as it descends it bears down the presser with it. and by means of a pin which goes horizontally through the beam and presser. the latter rises as the beam is elevated from the article which has been subjected to pressure: Above the press lies the lever by which the power is applied. Its fulcrum or pivot is a [illegible] passing through the vertical post above the moving end of the pressing beam. This fulcrum is like a staple bolt one fork or [illegible] of which goes through the post the other through the lever towards the center of the machine any required distance according to the power wanted. Where it receives a crank connected with the moveable end of the pressing. so that as the lever is raised or depressed it raises or bears down the end of the pressing lever connected therewith and thereby the presser or follower which is between the end of the pressing beam that moves and the end which

1663X is kept stationary by the wedge above it. The force applied is a weight supported by a cord passing over a pulley at the extremity of the lever farthest from the fulcrum. As this lever descends, the pivot of the crank which connects it with the pressing beam comes towards a direct line between the place of its being attached to the beam and the fulcrum of the lever thereby increasing in power which is a principle in the construction of this press and from which its name of increasing Press is derived. One end of the cord which supports the weight passes round a small cylinder near the bottom of the press and to which a crank is applied for winding it up or the contrary so that by turning it the weight is elevated from the floor and bears on the lever by pressing over the pulley at its extremity. On the contrary when it is necessary to take off the pressure the weight is suffered to descend to the floor and that end of the lever to rise the wedge is withdrawn from above the fulcrum of the pressing beam and the follower or press is elevated. The principles of this press may be applied to act in all directions vertical horizontal and inclined, and its power increased in any ratio agreeably to the objects to which it may be applied.

Exd. Witnesses present
M.G.C. [illegible] [illegible] Abraham [illegible]
Aaron Smith ( Patented February 11. 1812. )